(12) United States Patent
Fukuzawa et al.

(10) Patent No.: US 8,213,129 B2
(45) Date of Patent: Jul. 3, 2012

(54) CURRENT-PERPENDICULAR-TO-PLANE MAGNETORESISTIVE ELEMENT IN WHICH THE MAGNETIZATION DIRECTION OF AN INTERMEDIATE METALLIC MAGNETIC LAYER IS TWISTED

(75) Inventors: Hideaki Fukuzawa, Sagamihara (JP); Hiromi Yuasa, Yokohama (JP); Hitoshi Iwasaki, Yokosuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1110 days.

(21) Appl. No.: 11/215,971

(22) Filed: Sep. 1, 2005

(65) Prior Publication Data
US 2006/0050444 A1 Mar. 9, 2006

(30) Foreign Application Priority Data
Sep. 3, 2004 (JP) .................. 2004-257123

(51) Int. Cl.
*G11B 5/33* (2006.01)
(52) U.S. Cl. ...................................... 360/324
(58) Field of Classification Search ............. 360/324
See application file for complete search history.

(56) References Cited

U.S. PATENT DOCUMENTS

| | | | | |
|---|---|---|---|---|
| 5,715,121 A * | 2/1998 | Sakakima et al. | ......... | 360/324.2 |
| 6,232,777 B1 * | 5/2001 | Sato et al. | ........... | 324/252 |
| 6,560,077 B2 * | 5/2003 | Fujiwara et al. | ........... | 360/324.1 |
| 6,603,642 B1 | 8/2003 | Araki et al. | | |
| 6,937,446 B2 * | 8/2005 | Kamiguchi et al. | ....... | 360/324.1 |
| 6,937,447 B2 | 8/2005 | Okuno et al. | | |
| 2002/0054461 A1 * | 5/2002 | Fujiwara et al. | ........... | 360/324.1 |
| 2003/0123200 A1 * | 7/2003 | Nagasaka et al. | .......... | 360/324.1 |
| 2004/0021990 A1 | 2/2004 | Koui et al. | | |
| 2004/0086751 A1 * | 5/2004 | Hasegawa et al. | ............ | 428/692 |
| 2004/0201929 A1 * | 10/2004 | Hashimoto et al. | ........ | 360/324.1 |
| 2005/0002126 A1 * | 1/2005 | Fujiwara et al. | ........... | 360/324.1 |

FOREIGN PATENT DOCUMENTS

| | | | |
|---|---|---|---|
| CN | 1419232 A | | 5/2003 |
| EP | 780912 A1 * | | 6/1997 |
| JP | 09172212 A * | | 6/1997 |
| JP | 2001-298226 | | 10/2001 |
| JP | 2003-204095 | | 7/2003 |

OTHER PUBLICATIONS

Munoz et al, Ballistic magnetoresistance in nanocontact between a Ni cluster and a magnetic thin film, Applied Physics Letters, vol. 79, No. 18, pp. 2946-2948.*

* cited by examiner

*Primary Examiner* — David D Davis
(74) *Attorney, Agent, or Firm* — Oblon, Spivak, McClelland, Maier & Neustadt, L.L.P.

(57) ABSTRACT

A magnetoresistive element includes at least three metallic magnetic layers, at least two connection layers provided between the at least three metallic magnetic layers, each having an insulating layer and current confined paths including a metallic magnetic material penetrating the insulating layer, and electrodes which supply a current perpendicularly to a plane of a stacked film of the metallic magnetic layers and the connection layers.

10 Claims, 8 Drawing Sheets

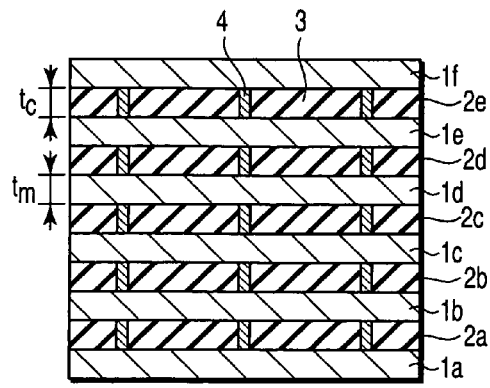 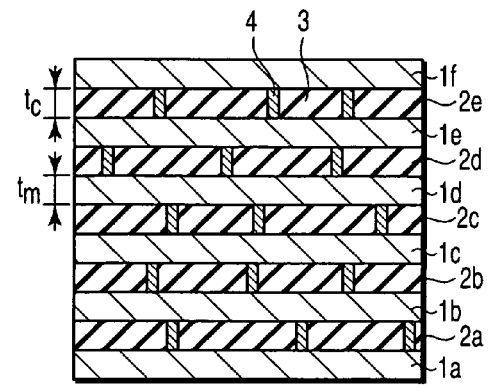
F I G. 1A    F I G. 1B
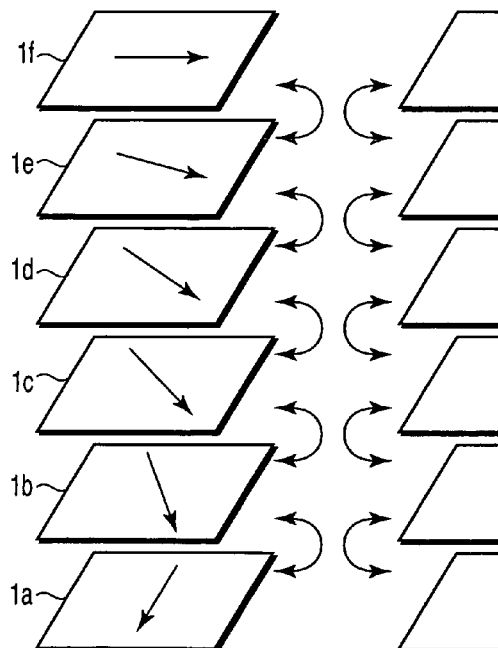 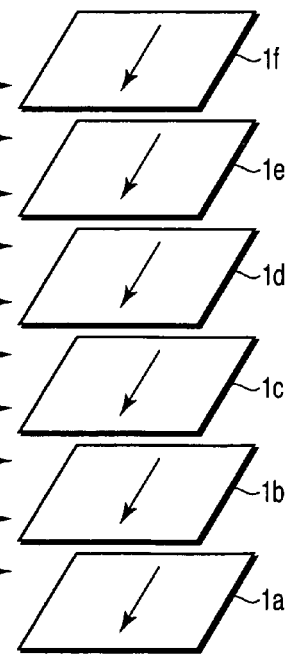 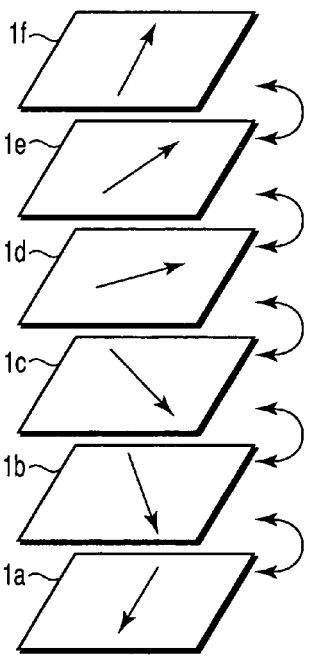
F I G. 2A    F I G. 2B    F I G. 2C

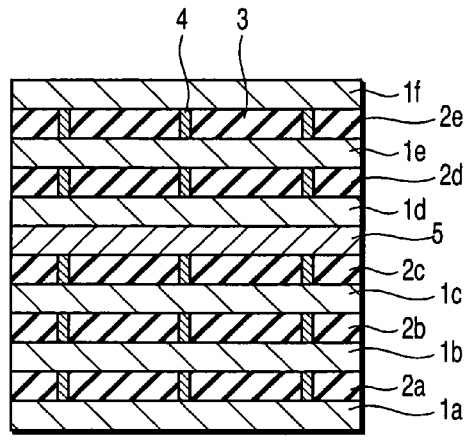
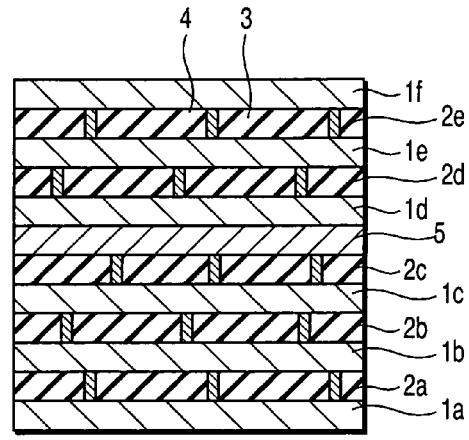
F I G. 5A                F I G. 5B
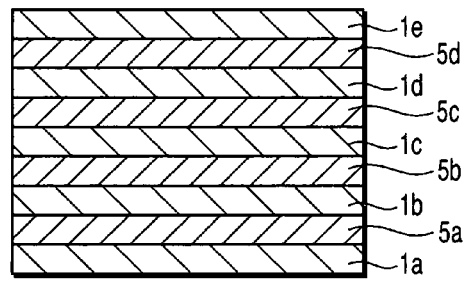
F I G. 6
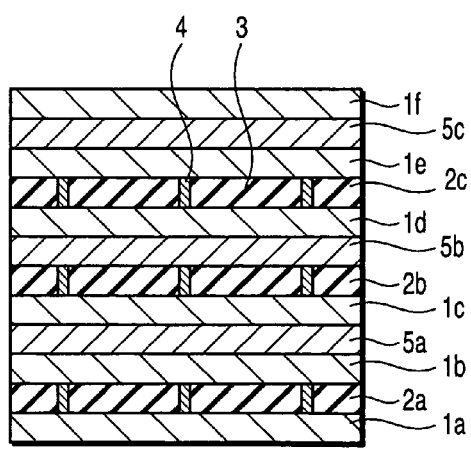
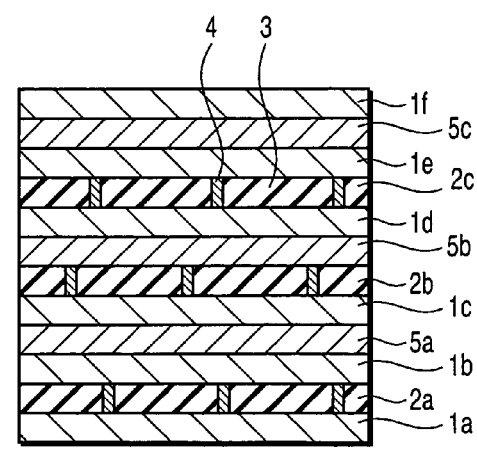
F I G. 7A                F I G. 7B

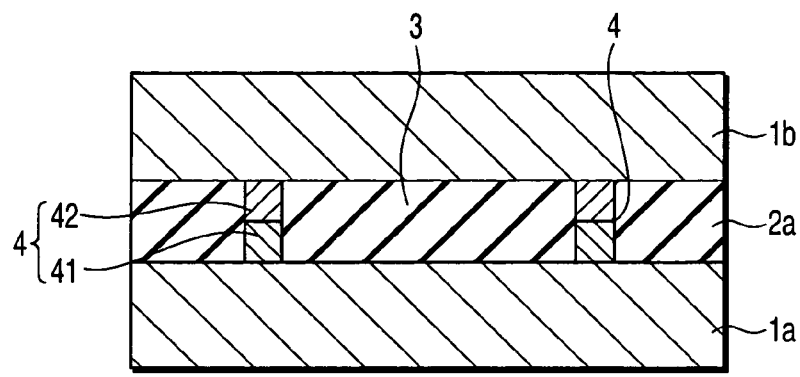
F I G. 8
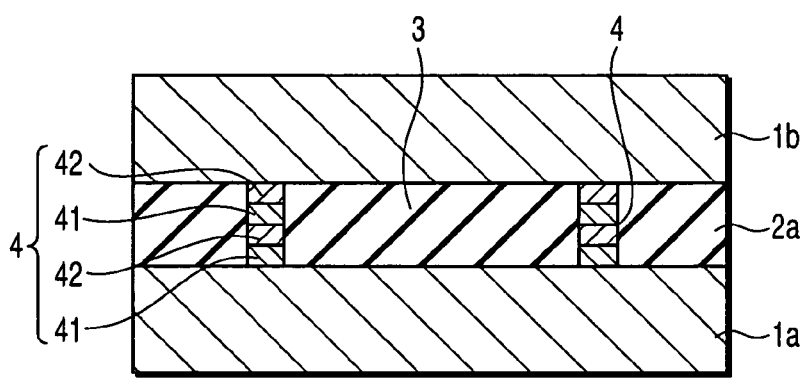
F I G. 9

CURRENT-PERPENDICULAR-TO-PLANE MAGNETORESISTIVE ELEMENT IN WHICH THE MAGNETIZATION DIRECTION OF AN INTERMEDIATE METALLIC MAGNETIC LAYER IS TWISTED

CROSS-REFERENCE TO RELATED APPLICATIONS

This application is based upon and claims the benefit of priority from prior Japanese Patent Application No. 2004-257123, filed Sep. 3, 2004, the entire contents of which are incorporated herein by reference.

BACKGROUND OF THE INVENTION

1. Field of the Invention

The present invention relates to a magnetoresistive element having a structure in which a current is supplied perpendicularly to the plane of the element, as well as a magnetic head, a magnetic recording apparatus and a magnetic memory which use the magnetoresistive element.

2. Description of the Related Art

The performance of magnetic devices has drastically been improved by discovery of a giant magnetoresistive effect (GMR) in a stacked structure of magnetic films. In particular, a spin-valve film (SV film) has a structure easily applicable to a magnetic device to enable the GMR effect to be effectively produced. Consequently, the spin-valve film has brought about marked technical improvement to magnetic heads and magnetic devices such as MRAMs (magnetic random access memories).

The "spin-valve film" is a stacked film having a structure in which a nonmagnetic metal spacer layer is sandwiched between two ferromagnetic layers. In the spin-valve film, the magnetization of one ferromagnetic layer (referred to as a "pinned layer" or "magnetization pinned layer") is pinned by an antiferromagnetic layer or the like, whereas the magnetization of the other ferromagnetic layer (referred to as a "free layer" or "magnetization free layer") is made rotatable in accordance with an external field (for example, a media field). In the spin-valve film, a giant magnetoresistace change can be produced by varying the relative angle between the magnetization directions of the pinned layer and free layer.

Conventional spin-valve films are CIP (current-in-plane)-GMR elements in which a sense current is supplied parallel to the plane of the element. In recent years, much attention has been paid to CPP (current-perpendicular-to-plane)-GMR elements (referred to as "CPP elements" hereinafter) in which a sense current is supplied substantially perpendicular to the plane of the element.

When such a magnetoresistive element is applied to a magnetic head, a higher element resistance poses problems in regard to shot noise and high frequency response. It is appropriate to evaluate the element resistance in terms of RA (a product of the resistance and the area). Specifically, RA must be less than 1 $\Omega\mu m^2$ at a recording density of 200 Gbpsi (Gigabit per square inch).

In connection with these requirements, the CPP element is advantageous in that the resistance of the element depends on its area so that reduction in the size of the element increases the change in resistance. The CPP element is thus advantageously applicable on a trend of increasingly reducing the size of the magnetic device. Under the circumstances, the CPP element and the magnetic head using the same are expected to be promising candidates to achieve a recording density of 200 Gbpsi to 1 Tbpsi (terabits per square inch).

However, CPP elements using a spacer layer made of a nonmagnetic metal exhibit only a very small resistance change. The CPP elements are thus hard to provide high output signals.

To partially solve this problem, a CPP (current-confined-path) element has been proposed which uses a spacer layer comprising an insulating layer in which fine current paths (current confined paths) consisting of a nonmagnetic metal penetrating the insulating layer are formed. Such a CPP element (referred to as a CCP-CPP element hereinafter) exhibits a current confining effect and provides high output signals than a simple CPP element using a nonmagnetic metal spacer layer. However, if the CCP-CPP element were applied to a magnetic head adapted for high density recording, the MR ratio thereof might still be insufficient.

An element that realizes an MR ratio high enough to adapt to a high recording density has been proposed which has a spacer layer in which current confined paths in an oxide layer are formed of a metallic magnetic material and utilizes a ballistic magnetoresistive (BMR) effect (referred to as a BMR element hereinafter). See, for example, Jpn. Pat. Appln. Publication No. 2003-204095. However, a physical principle by which the BMR element allows to provide a high MR ratio is still unknown. Thus, a high MR ratio cannot be achieved simply by causing ballistic conduction in magnetic paths. Actually, there has not yet been reported that a BMR element in a stacked structure of thin films has achieved a higher MR ratio than that a conventional CPP element could have achieved. It is thus desired to provide an MR element that can achieve a high MR ratio based on a new mechanism.

The conventionally proposed BMR element has another problem besides the problem that there has not yet been experimentally confirmed that the element in a stacked structure of thin films can exhibit a high MR ratio. The another problem is due to a structure in which a current confined layer, comprising an insulating layer and fine current confined paths made of a metallic magnetic material penetrating the insulating layer, is provided between the pinned layer and the free layer. When the current confined layer comprising the insulating layer with the current confined paths made of the metallic magnetic material formed therein is used, magnitude of the interlayer coupling field $H_{in}$ between the pinned layer and the free layer may be increased, which disadvantageously prevents the magnetization of the free layer from rotating with respect to an external field. Here, the maximum value of $H_{in}$ in the conventional spin valve film is said to be limited at about 20 Oe, taking into consideration of practical use. However, for the CCP-CPP element and BMR element, it is disadvantageous to increase the thickness of the current confined layer, that is, the thickness of the insulating layer. Thus, even with the CCP-CPP element, which has current confined paths formed of a nonmagnetic metal material, the $H_{in}$ value may become higher than 20 Oe if process conditions are inappropriate. With the BMR element, which has current confined paths formed of a metallic magnetic material, it is difficult to reduce $H_{in}$ to a level less than 20 Oe. It is thus very difficult to put the BMR element into practical use. Accordingly, a practical element cannot be implemented easily using the so-called BMR element. Moreover, as described previously, the physical principle on the basis of the structure by which the BMR element allows to provide a high MR ratio is still unknown. Therefore, the BMR element in a stacked structure of thin films cannot experimentally realize a high MR ratio at present if only $H_{in}$ could be reduced.

BRIEF SUMMARY OF THE INVENTION

A magnetoresistive element according to one aspect of the present invention comprises: at least three metallic magnetic layers; at least two connection layers provided between the at least three metallic magnetic layers, each having an insulating layer and current confined paths comprising a metallic magnetic material penetrating the insulating layer; and electrodes which supply a current perpendicularly to a plane of a stacked film of the metallic magnetic layers and the connection layers.

A magnetoresistive element according to another aspect of the present invention comprises: at least three metallic magnetic layers; at least two nonmagnetic metal layers provided between the at least three metallic magnetic layers; and electrodes which supply a current perpendicularly to a plane of a stacked film of the metallic magnetic layers and the nonmagnetic metal layers.

A magnetoresistive element according to still another aspect of the present invention comprises: at least three metallic magnetic layers; at least two layers provided between the at least three metallic magnetic layers, each of the at least two layers being selected from the group consisting of a connection layer having an insulating layer and current confined paths comprising a metallic magnetic material penetrating the insulating layer, a nonmagnetic metal layer and a stack of the connection layer and the nonmagnetic metal layer; and electrodes which supply a current perpendicularly to a plane of a stacked film of the metallic magnetic layers and the connection layers.

A magnetic head according to the present invention comprises the above magnetoresistive element. A magnetic recording apparatus according to the present invention comprises a magnetic recording media and the above magnetic head. A magnetic memory according to the present invention comprises the above magnetoresistive element.

BRIEF DESCRIPTION OF THE SEVERAL VIEWS OF THE DRAWING

FIGS. 1A and 1B are cross-sectional views of a major portion a magnetoresistive element according to an embodiment of the present invention, respectively;

FIGS. 2A, 2B and 2C are diagrams illustrating the magnetization directions of metallic magnetic layers in a magnetoresistive element according to an embodiment of the present invention;

FIGS. 5A and 5B are cross-sectional views of a major portion of a magnetoresistive element according to another embodiment of the present invention, respectively;

FIG. 6 is a cross-sectional view of a major portion of a magnetoresistive element according to yet another embodiment of the present invention;

FIG. 7A and 7B are cross-sectional views of a major portion of a magnetoresistive element according to still another embodiment of the present invention, respectively;

FIG. 8 is a cross-sectional view of a major portion of a magnetoresistive element according to further another embodiment of the present invention;

FIG. 9 is a cross-sectional view of a major portion of a magnetoresistive element according to yet another embodiment of the present invention;

DETAILED DESCRIPTION OF THE INVENTION

Figure 3:
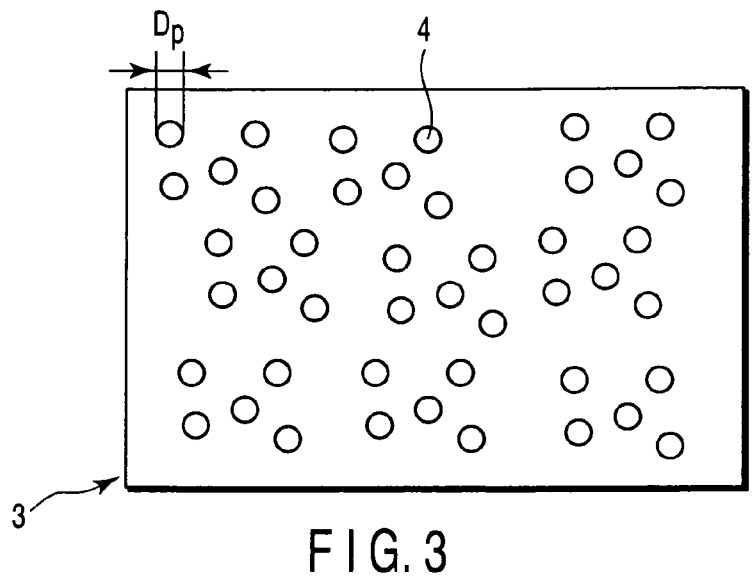
FIG. 3 is a plan view showing the film surface of a connection layer contained in a magnetoresistive element according to an embodiment of the present invention.

FIG. 1A shows a cross-sectional view of a major portion of a magnetoresistive element (also referred to as a spring spin-valve film) according to an embodiment of the present invention. In this figure, a metallic magnetic layer $1a$, a connection layer $2a$, a metallic magnetic layer $1b$, a connection layer $2b$, a metallic magnetic layer $1c$, a connection layer $2c$, a metallic magnetic layer $1d$, a connection layer $2d$, a metallic magnetic layer $1e$, a connection layer $2e$, and a metallic magnetic layer $1f$ are stacked. Each of the connection layers $2a$ to $2e$ comprises an insulating layer 3 and current confined paths 4 formed of a metallic magnetic layer penetrating the insulating layer 3. The current confined paths containing the metallic magnetic material electrically connect the adjacent metallic magnetic layers (to form ohmic contact). A lower electrode, a buffer layer, a pinning layer, and the like are provided below the stacked film shown in FIG. 1A. A cap layer, an upper electrode, and the like are provided above the stacked film shown in FIG. 1A. A current is supplied perpendicularly to the plane of the stacked film shown in FIG. 1A.

In the stacked film shown in FIG. 1A, the adjacent metallic magnetic layers are magnetically weakly coupled through the connection layer sandwiched therebetween. With reference to FIGS. 2A, 2B and 2C, the magnetization directions of the metallic magnetic layers $1a$ to $1f$ at zero external field (media field) and at a certain external field (media field) will be described. The lowermost metallic magnetic layer $1a$ has magnetization pinned to a direction to function as a pinned layer. The uppermost metallic magnetic layer $1f$ varies magnetization direction thereof depending on an external field to function as a free layer. The functions of the metallic magnetic layers $1b$ to $1e$ and connection layers $2a$ to $2e$ located between the lowermost metallic magnetic layer $1a$ and the uppermost metallic magnetic layer $1f$ cannot be simply classified as those of a pinned layer, a spacer layer, or a free layer as in a normal spin-valve film. It should be noted that in FIG. 1A the current confined paths 4 are depicted as if they are located at the corresponding positions in the upper and lower connection layers throughout the connection layers $2a$ to $2e$. However, the current confined paths 4 are not always located at the corresponding positions in the upper and lower connection layers throughout the connection layers $2a$ to $2e$. Indeed, the positions of the current confined paths 4, which are formed by the manufacturing processes described in the later Examples, are different in the respective connection layers 2a to 2e, as shown in FIG. 1B. Both the magnetoresistive elements having the structures of FIGS. 1A are 1B can provide an effect according to the present invention.

As shown in FIG. 2A, at zero external field, the magnetization direction of the uppermost metallic magnetic layer 1f is biased so as to be almost orthogonal to that of the lowermost metallic magnetic layer 1a. Further, the magnetization directions of the metallic magnetic layers 1b to 1e located between the lowermost metallic magnetic layer 1a and the uppermost metallic magnetic layer 1f are varied slightly from one another so as to be twisted gradually. Since the three or more layers of metallic magnetic layers are thus magnetically weakly coupled with their magnetization directions gradually twisted like a spring, the stacked film shown in FIG. 1A or 1B is named a spring spin-valve film.

As shown in FIG. 2B, when an external field is applied to a certain direction (e.g., a case where the bit data on the media is "1"), the magnetization direction of the uppermost metallic magnetic layer 1f changes depending on the direction of the external field. Correspondingly, the magnetization directions of the intermediate metallic magnetic layers 1e to 1b are varied slightly. Then, if the magnetization direction of the uppermost metallic magnetic layer 1f is parallel to that of the lowermost metallic magnetic layer 1a as shown in FIG. 2B, a decreased resistance is sensed upon supplying a sense current perpendicularly to the plane of the element.

On the other hand, as shown in FIG. 2C, when an external field is applied to the opposite direction to the case of FIG. 2B (e.g., a case where the bit data on the media is "0"), the magnetization direction of the uppermost metallic magnetic layer 1f changes to the direction opposite to that in FIG. 2B. Whereas, the magnetization direction of the lowermost metallic magnetic layer 1a, which is pinned, is not changed like FIGS. 2A and 2B. Correspondingly, the magnetization directions of the intermediate metallic magnetic layers 1e to 1b are twisted significantly so as to make the magnetization directions of the uppermost metallic magnetic layer 1f and the lowermost metallic magnetic layer 1a almost anti-parallel alignment. Then, in this state, an increased resistance is sensed upon supplying a sense current perpendicularly to the plane of the element.

On the basis of the above principle, the magnetoresistive element according to the embodiment of the present invention can reasonably accomplish both practical operation as a spin-valve film and a high MR ratio.

Now, materials used for the magnetoresistive element according to the embodiment of the present invention will be described.

(i) The lower electrode is formed of Cu, Au, Cr, or Ta.

(ii) The buffer layer (under layer) is formed of any of the materials listed below.

A metal selected from the group consisting of Ti, Ta, W, Cr, Mo, Nb, V, Zr, and Hf or an alloy containing any of these metals [thickness: 3 nm or more and 10 nm or less], Ta [3 to 5 nm]/Ru [2 nm], NiFeCr [3 to 5 nm], Ta [3 nm]/NiFeCr [3 to 5 nm], and Ta [3 nm]/NiFe [3 to 5 nm].

(iii) The pinning layer is formed of any of the materials listed below.

An antiferromagnetic layer made of IrMn, PtMn, or PdPtMn, a hard layer made of CoPt, CoPrCr, or FePt, an antiferromagnetic layer (such as IrMn, PtMn, and PdPtMn)/a ferromagnetic layer/Ru, a hard layer (such as CoPt, CoPrCr, and FePt)/a ferromagnetic layer/Ru.

A pinning layer of a stacked structure such as PtMn/CoFe [3 nm]/Ru is referred to as a synthetic pinning layer because the upper and lower metallic magnetic layers to the Ru layer are antiferromagnetically coupled through the Ru layer. The pinning layer may be a single pinning layer made of IrMn, PtMn, or PdPtMn or a hard layer. However, the synthetic pinning layer can substantially eliminate net magnetic moment of the pinned layer to prevent the adverse effect of a leakage field from the pinned layer. A material for the ferromagnetic layer contained in the synthetic pinning layer may be similar to that for a metallic magnetic layer in the spring spin-valve film described later. Accordingly, for the material for the ferromagnetic layer, read the corresponding description.

The thickness of the metallic magnetic layer formed below Ru contained in the synthetic pinning layer is desirably at most half the total thickness of the metallic magnetic layer contained in the spring spin-valve film above Ru. Further, the thickness of the metallic magnetic layer formed below Ru is desirably 1 to 10 nm, and more desirably 1 to 5 nm.

(iv) The pinned layer is formed of any of the materials listed below and may be a single magnetic layer or a stacked film made of a magnetic layer and a nonmagnetic layer.

Fe, Co, Ni, Co—Fe, Ni—Fe, Ni—Fe, Ni—Co, Fe—Co—Ni, an alloy containing Co, an alloy containing Ni, or an alloy containing Fe, (FeCo/Cu)×n cycles, (CoNi/Cu)×n cycles, (NiFe/Cu)×n cycles, and (FeCoNi/Cu)×n cycles.

A stacked film of, for example, (FeCo/Cu)×n preferably uses an Fe-rich magnetic layer with a Fe concentration of 50% or more. Such a metallic magnetic layer has an effect of enhancing bulk scattering. In enhancing the magnetic coupling between the upper and lower metallic magnetic layers, it is not preferable to make the thickness of a nonmagnetic layer such as Cu excessively thick. The thickness thereof is preferably 0.1 to 1 nm, and more preferably 0.1 to 0.5 nm. Alternatively, a Heuslar alloy material such as CoMnGe, NiMnSb or SiMnGe may be used.

Further, additive elements may be added to these magnetic materials. The additive elements include Cu, Cr, Ti, V, Mn, Zr, Nb, Mo, Hf, Ta, W, and Pt. An FeCoCu alloy containing FeCo to which Cu is added is particularly preferable because it enhances the bulk scattering effect. The concentration of nonmagnetic additive element preferably ranges between 1 at % or more and 50 at % or less, more preferably between 2 at % or more and 20 at % or less. Further, these metallic magnetic materials may be nitrided.

The thickness $t_m$ of the metallic magnetic layer is desirably 1 to 10 nm and more desirably 1.5 to 5 nm. A plurality of metallic magnetic layers may be formed of the same material or different materials. However, since a metallic magnetic layer located away from the pinning layer must be able to easily rotate magnetization thereof to a media field, it is preferably formed of a NiFe, CoFe, NiCo, Fe, NiFeCo, or CoFeNi alloy, or a soft magnetic material prepared by adding an additive element to any of these alloys. On the other hand, a material for a metallic magnetic layer close to the pinning layer need not be limited to the soft magnetic material. It is preferable to use a magnetic material that is advantageous for providing a high MR ratio.

At least three metallic magnetic layers allow the function of the spring spin-valve film. The number of the metallic magnetic layers is preferably 3 to 20, and more preferably 3 to 10. The total thickness of the metallic magnetic layers is preferably about 3 to 30 nm, and more preferably about 5 to 20 mm. The excessively large total thickness of the metallic magnetic layers increases the MR ratio but also provides an increased resistance. This is not preferable in terms of high frequency response. When the total thickness of the metallic magnetic layers is small, it is preferable in terms of processes for manufacturing a magnetic heat or MRAM. However, the excessively small total thickness of the metallic magnetic layers may limit the selection of a material exhibiting a high MR ratio.

The crystal structure of the metallic magnetic layer desirably has a fcc (111) orientation for an fcc structure, a bcc (110) orientation for a bcc structure, and a hcp (001) or (110) orientation for an hcp structure.

The crystal orientation desirably has a dispersion angle of 4.0° or less, more preferably at most 3.5° or less, further preferably at most 3.0° or less. This value can be obtained by, for example, measuring the full width at half maximum of a rocking curve at a peak position obtained by θ-2θ measurements based on X-ray diffraction analysis. In the magnetic head, this value can be sensed as a dispersion angle of a nano-diffraction spot in a cross section.

(v) The connection layer (current confined layer) contains an insulating layer 3 and current confined paths 4 formed of a metallic magnetic layer penetrating the insulating layer 3. The connection layer has a function for coupling, magnetically and in a sense electronic conduction, adjacent metallic magnetic layers. A current supplied perpendicularly to the plane of the element flows through the current confined paths but not through the insulating layer surrounding the current confined paths. By magnetically coupling the metallic magnetic layers through the connection layers, it is possible to realize the state in which the magnetization directions are gradually twisted over the metallic magnetic layers as shown in FIG. 2. This enables the spring spin-valve film to operate appropriately.

Like the above metallic magnetic layer, materials for the current confined paths 4 include an ally containing Fe, Co, or Ni, a CoFe alloy, a NiFe alloy, a NiCo alloy, and a stacked layer of such a metallic magnetic layer and a very thin nonmagnetic metal layer. Materials for the nonmagnetic metal layer include Cu, Cr, Ti, V, Mn, Zr, Nb, Mo, Hf, Ta, and W.

If a stacked film is used for the current confined paths, the excessively large thickness of the nonmagnetic metal layer is not preferable because it weakens magnetic coupling between the upper and lower metallic magnetic layers sandwiching the connection layer. However, by using the stacked film as the current confined paths and appropriately setting the thickness of the nonmagnetic metal layer, it is possible to control the intensity of the magnetic coupling between the upper and lower metallic magnetic layers sandwiching the connection layer. This makes it possible to advantageously control the magnetization rotation angle of each of the metallic magnetic layers shown in FIG. 2A. The thickness of the nonmagnetic layer is preferably 0.1 to 1 nm, and more preferably 0.1 to 0.5 nm.

Materials for the insulating layer 3 surrounding the current confined paths 4 include AlOx (typically $Al_2O_3$), SiOx (typically $SiO_2$), MgO, ZrOx, HfOx, TiOx, CrOx, FeOx, FeCoCx, NiOx, CoOx, VOx, WOx, and TaOx.

As a material for the insulating layer 3, AlOx, SiOx, HfOx, and ZrOx are particularly preferable because they appropriately maintain the insulating property between the upper and lower metallic magnetic layers sandwiching the connection layer. These oxides may contain an oxide of Zr, Hf, Mg, Nb, Ta, Ti, Cr, V, or W as an additive element. The material for the insulating layer 3 may be a magnetic oxide such as FeOx, CoOx, or NiOx. If the insulating layer is formed of the magnetic oxide, the magnetic coupling between the upper and lower metallic magnetic layers sandwiching the connection layer, is a combination of the magnetic coupling through the current confined paths 4 and magnetic coupling through the insulating layer 3 formed of the magnetic oxide. Consequently, the magnetic coupling can be controlled in various manners. In particular, FeOx often exhibits a Neel temperature or a Curie point considerably higher than room temperature, so that it can be advantageously applied to a magnetoresistive element operated at room temperature. FeOx includes, for example, a spinel oxide such as $Fe_3O_4$, $CoFe_2O_4$, $MnFe_2O_4$, $NiFe_2O_4$, or $\gamma\text{-}Fe_2O_3$, or a corundum-based antiferromagnetic material such as $\alpha\text{-}Fe_2O_3$. The material for the insulating layer 3 is not limited to the oxide but may be a nitride.

The thickness $t_c$ of the connection layer (insulating layer 3 and current confined paths 4) is preferably 0.5 to 5 nm, and more preferably 1 to 2 nm in terms of the ease of formation of very small sized current confined paths 4.

FIG. 3 is a plan view showing the film surface of the connection layer. The size $D_p$ of one current confined path 4 in the film surface of the connection layer is preferably 0.5 to 10 nm, and more preferably 1 to 7 nm. The area ratio of the current confined paths 4 to the film surface of the connection layer is preferably 1 to 30%, and more preferably 3 to 20%. The size and area ratio of the current confined paths 4 determine the magnitude of the magnetic coupling between the upper and lower metallic magnetic layers sandwiching the connection layers and the magnetization rotation angle, as well as the value of the MR ratio. If the size $D_p$ and the area ratio of the current confined paths 4 are within the above ranges, the spring spin-valve film operates appropriately.

The connection layer can be formed using such a method described below. For example, a metal material to be formed into current confined paths and another metal material to be converted into an insulating layer are deposited by sputtering, MBE, CVD, evaporation, or the like. Then, an oxidation process is performed to oxidize the metal material to be converted into the insulating material. In this case, if the two metal materials to be formed into the current confined paths and insulating layer are deposited in a mixed state, the metal material to be formed into the current confined paths is kept as a metal owing to a difference in oxidation activity during oxidation, making it possible to form the current confined paths. The oxidation method may be natural oxidation, radical oxidation, ion beam oxidation, or RF plasma oxidation. The substrate may be irradiated with UV or heated during the oxidation process in order to improve the oxidation activity. Ion beam oxidation and RF plasma oxidation are preferably used in order to form current confined paths with their size properly controlled. For ion beam oxidation, an oxygen gas may be introduced into an ion source or directly into an oxidation chamber. Acceleration energy for ion beams is preferably set to a range between 50 and 100 V.

Alternatively, alloy materials to be formed into an insulating layer and current confined paths may be RF co-sputtered and thus deposited while remaining separated from each other. In particular, this method can be effectively used if the material for the insulating layer is AlOx or SiOx.

(vi) The cap layer is formed of either of the materials listed below.

Cu [0 to 10 nm]/Ta [1 to 5 nm], and
Cu [0 to 10 nm]/Ru [0 to 10 nm].

(vii) Like the lower electrode, the upper electrode is formed of Cu, Au, Cu, or Ta.

Figure 4:
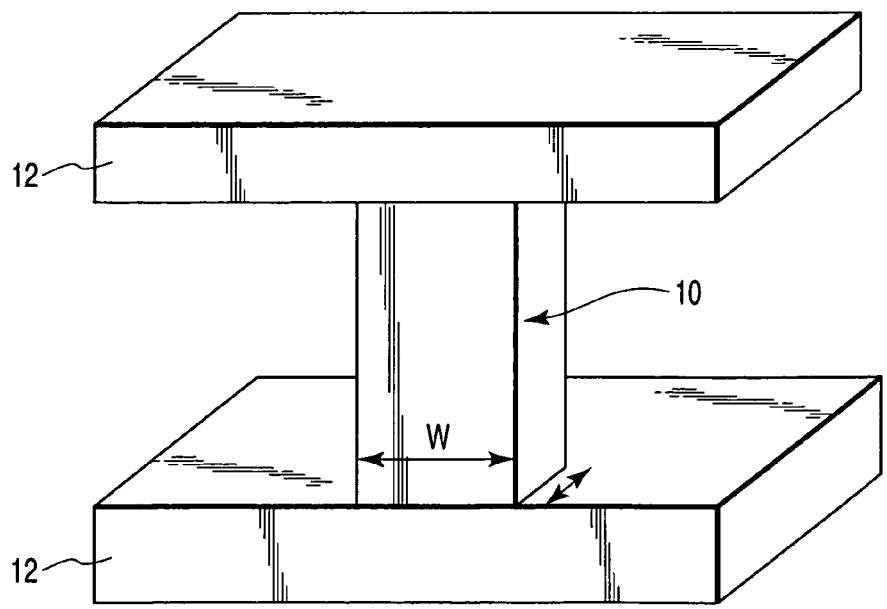
FIG. 4 is a perspective view of a magnetoresistive element according to an embodiment of the present invention.

As shown in FIG. 4, a magnetoresistive element (spring spin-valve film) 10 according to an embodiment of the present invention is arranged between a lower electrode 11 and an upper electrode 12. A current is supplied perpendicularly to the plane of the element.

When the spring spin-valve film according to the embodiment of the present invention is applied to a magnetic head, the width W of the spring spin-valve film 10 is processed in association with the track width. The width W is set to 0.1 μm or less, and to 50 nm or less for a higher recording density. The depth h of the spring spin-valve film 10 is also processed so as to be almost as large as the width W. To bias the magnetization direction of the free layer so that it is orthogonal to the magnetization direction of the pinned layer, for example, a hard layer may be provided on both sides of the spring spin-valve film 10 or an in-stack bias layer is provided on the spring spin-valve film 10.

When the spring spin-valve film according to the embodiment of the present invention is applied to a magnetic memory (MRAM), it may sized larger than that used for the magnetic head. The size W and h may be processed so as to be 1 μm or less. In general, no biasing layer is provided and the shape of the spring spin-valve film 10 is modified to exhibit uniaxial anisotropy, thus enabling switching operations.

The magnetoresistive element (spring spin-valve film) according to the embodiment of the present invention can achieve a high MR ratio of 20 to 1,000% and a low RA of 60 to 1,000 mΩμm².

A specific example of the magnetoresistive element (spring spin-valve element) corresponding to an aforementioned embodiment will be described. The film configuration is as follows.

Lower electrode: Cu,
Buffer layer: Ta [5 nm]/NiFeCr [5 nm],
Pinning layer: PtMn [15 nm]/CoFe [3 nm]/Ru [1 nm],
Metallic magnetic layer: CoFe [2 nm],
Connection layer: $Al_2O_3$ [1.5 nm] containing Co current confined paths,
Metallic magnetic layer: CoFe [2 nm],
Connection layer: $Al_2O_3$ [1.5 nm] containing Co current confined paths,
Metallic magnetic layer: CoFe [1 nm]/NiFe [3 nm],
Cap layer: Cu [1 nm]/Ru [5 nm],
Upper electrode: Cu.

The magnetoresistive element (spring spin-valve film) is manufactured as described below. Cu is deposited on a substrate and patterned to form a lower electrode. The substrate is loaded into a DC magnetron sputtering apparatus. This apparatus has an oxidation chamber connected to sputtering chambers via vacuum valves. The following films are deposited: a buffer layer: Ta/NiFeCr, a pinning layer: PtMn/CoFe/Ru, and a metallic magnetic layer: CoFe.

Al [0.9 nm] to be converted into an insulating layer in a connection layer is deposited. In this stage, the substrate is transferred to the oxidation chamber for ion beam oxidation, RF plasma oxidation, or radical oxidation. This oxidation process enables to oxidize Al into $Al_2O_3$, the insulating layer in the connection layer, while causing the underlayer of CoFe to be sucked up through $Al_2O_3$ to form current confined paths.

In this case, it is preferable to perform ion beam oxidation or RF plasma oxidation, which is an oxidation process likely to facilitate migration of atoms.

Alternatively, an AlCo alloy of Co to be formed into current confined paths and Al to be converted into an insulating layer may be deposited on the substrate, which may then be transferred to the oxidation chamber for oxidation. The composition of the AlCo alloy desirably ranges from $Al_{80}Co_{30}$ to $Al_{95}Co_5$. Because Al and Co are insoluble with each other, they are easily deposited while remaining separated from each other. Oxidizing the alloy in this state oxidizes Al, which is easily oxidized, while forming Cu, which is not easily oxidized, into current confined paths. Also in this case, it is preferable to perform ion beam oxidation or RF plasma oxidation, which is an oxidation process likely to facilitate migration of atoms.

As described above, the thickness $t_c$ of the connection layer is preferably 0.5 to 5 nm and more preferably 1 to 2 nm. The thickness of the connection layer within the range facilitates the formation of an oxide layer having metal confined portions. Further, the oxide layer effectively produces an insulation effect.

Then, the substrate is conveyed to a sputtering chamber again. A metallic magnetic layer: CoFe [2 nm] is then deposited. Subsequently, Al or AlCo, which is to form a connection layer, is deposited. The substrate is then transferred to the oxidation chamber and oxidized to form a connection layer.

Then, the substrate is transferred to a sputtering chamber again. A metallic magnetic layer: CoFe [1 nm]/NiFe [3 nm] and a cap layer: Cu [1 nm]/Ru [5 nm] are then deposited.

After the deposition, the substrate is subjected to heat treatment in a magnetic field of about 10 kOe at 290° C. for four hours. The heat treatment enables ordering of PtMn and allows oxygen insufficiently bonded to magnetic elements in the current confined paths to be bonded to easily oxidized elements. For example, although CoO is present in the as-deposited connection layer, the heat treatment reduces CoO and allows oxygen to be bonded with Al, which is easily oxidized, to generate $Al_2O_3$. As a result, current confined paths are formed which contain a purer metallic magnetic material.

Subsequently, the spring spin-valve film is finely processed by photolithography so that the width thereof is almost equal to the track width. Specifically, the spring spin-valve film is patterned so that the one side of the element has a size of 100 to 30 nm. This spring spin-valve film exhibits an area resistance RA of about 500 mΩμm² and a high MR ratio.

FIG. 5A shows a cross-sectional view of a major portion of a magnetoresistive element (spring spin-valve film) according to another embodiment of the present invention. In this figure, the metallic magnetic layer 1a, the connection layer 2a, the metallic magnetic layer 1b, the connection layer 2b, the metallic magnetic layer 1c, the connection layer 2c, a nonmagnetic metal layer 5, the metallic magnetic layer 1d, the connection layer 2d, the metallic magnetic layer 1e, the connection layer 2e, and the metallic magnetic layer 1f are stacked. The magnetoresistive element shown in FIG. 5A differs from that shown in FIG. 1A in that a nonmagnetic metal layer 5 consisting of Cu or the like is formed between the connection layer 2c and the metallic magnetic layer 1d.

If the nonmagnetic metal layer 5 has a large thickness of 2 nm or more, the upper and lower metallic magnetic layers 1c and 1d sandwiching the nonmagnetic metal layer 5 are substantially not magnetically coupled except for small interlayer coupling fields (a Neel coupling field resulting from Orange peel and a RKKY coupling field).

In contrast, if the nonmagnetic metal layer 5 has a relatively small thickness of, for example, 2 nm or less, magnetic coupling having a non-negligible magnitude occurs between the upper and lower metallic magnetic layers 1c and 1d sandwiching the nonmagnetic metal layer 5. Therefore, such a film configuration as shown in FIG. 5A enables the magnetization directions of the metallic magnetic layers to be gradually twisted as shown in FIG. 2A. This makes it possible to operate the spring spin-valve film appropriately.

To implement such a structure as shown in FIG. 5A, the thickness of the nonmagnetic metal layer 5 is set so that the upper and lower metallic magnetic layers exhibit a weak ferromagnetic coupling. If the nonmagnetic material is, for example, Cu, the thickness of Cu is preferably set as described below in view of a RKKY coupling component. That is, in connection with the RKKY magnetic coupling between the upper and lower metallic magnetic layers through the Cu layer, a phenomenon is known in which ferromagnetic coupling and antiferromagnetic coupling varies in a vibration manner with respect to the thickness of the nonmagnetic layer (S. S. P. Parkin et al., Phys. Rev. Lett., 66, 2152 (1991)). The thickness of Cu exhibiting ferromagnetic coupling in such a vibration phenomenon is, for example, 1 to 1.6 nm and 2.4 to 2.6 nm. If a perfectly flat film could be formed, it is preferable to use such a thickness range required to provide the ferromagnetic coupling. However, actually, the magnetic coupling between ferromagnetic layers through the nonmagnetic layer is not determined only by RKKY coupling. The Neel coupling (also referred to as Orange peel coupling) also occurs which is ferromagnetic coupling induced due to unevenness of the film. The magnitude of Neel coupling increases with decreasing thickness of the nonmagnetic layer. In the case of assuming that the ferromagnetic coupling is determined by Neel coupling, since the thickness of the nonmagnetic layer of 2 nm or less corresponds to non-negligible magnetic coupling and is desirably set to 1.5 nm or less in order to obtain ferromagnetic coupling components of a certain magnitude, the optimum thickness range would be set to 0.1 to 1.5 nm. The material for the nonmagnetic metal layer is not limited to Cu but may include Au, Ag, Cr, Mn, V, Ti, Zr, and an allow material containing any of these components. Of these components, Cu is particularly desirable in terms of thermal stability. Cr and Mn are desirable in terms of the ability to induce magnetic coupling of a relatively large magnitude between the upper and lower metallic magnetic layers.

FIG. 6 shows a cross-sectional view of a major portion of a magnetoresistive element (spring spin-valve film) according to yet another embodiment of the present invention. In this figure, the metallic magnetic layer 1a, a nonmagnetic metal layer 5a, the metallic magnetic layer 1b, a nonmagnetic metal layer 5b, the metallic magnetic layer 1c, a nonmagnetic metal layer 5c, the metallic magnetic layer 1d, a nonmagnetic metal layer 5d, and the metallic magnetic layer 1e are stacked. The film configuration of the magnetoresistive element shown in FIG. 6 corresponds to the magnetoresistive element shown in FIG. 1A in which the connection layers are replaced with the nonmagnetic metal layers. The material and thickness of the nonmagnetic metal layer are as described in FIG. 5A.

Also in this case, provided that the upper and lower metallic magnetic layers sandwiching the nonmagnetic metal layer are magnetically coupled, the magnetization directions of the metallic magnetic layers can be gradually twisted as shown in FIG. 2A. This makes it possible to operate the spring spin-valve film appropriately.

FIG. 7A shows a cross-sectional view of a major portion of a magnetoresistive element (spring spin-valve film) according to still another embodiment of the present invention. In this figure, between adjacent ones of the metallic magnetic layers 1a to 1f, a single film of a connection layer (for example, 2a or 2c), a single film of a nonmagnetic metal layer (for example, 5a or 5c), or a stacked film of a connection layer and a nonmagnetic metal layer (for example, 2b and 5b) is sandwiched. This film configuration also enables the magnetization directions of the metallic magnetic layers to be gradually twisted. This makes it possible to operate the spring spin-valve film appropriately.

As shown in FIGS. 1A, 5A, 6 and 7A, in the spring spin-valve film according to the embodiments of the present invention, at least two connection layers or nonmagnetic metal layers must be provided in order to allow all the metallic magnetic layers to be magnetically weakly coupled. This is because with only one connection layer or nonmagnetic metal layer, magnetic coupling is excessively effective. That is, by increasing the number of connection layers or nonmagnetic layers that magnetically couple the upper and lower metallic magnetic layers more weakly than the magnetic coupling in the magnetic metallic layers, it is possible to twist the magnetization directions of the metallic magnetic layers step by step as shown in FIG. 2A. This makes it possible to operate the spring spin-valve film appropriately. Also in FIGS. 5A and 7A, the current confined paths 4 are not always located at the corresponding positions in the upper and lower connection layers throughout the connection layers 2a to 2e, and the positions of the current confined paths 4 may be different in the respective connection layers 2a to 2e, as shown in FIG. 1B. These embodiments are shown in FIGS. 5B and 7B.

Now, with reference to FIGS. 8 to 11, description will be given of a structure according to further another embodiment of the present invention which, if a connection layer containing a metallic magnetic layer is used as current confined paths, is effective for reducing the magnetic coupling between the two metallic magnetic layers arranged over and under the connection layer. In FIGS. 8 to 11, for simplification, only the upper and lower metallic magnetic layers and the connection layer therebetween are illustrated.

In FIG. 8, the metallic magnetic layer 1a, the connection layer 2a, and the metallic magnetic layer 1b are stacked. The connection layer 2a comprises the insulating layer 3 and the current confined paths 4 penetrating the insulating layer 3. Each of the current confined paths 4 comprises a metallic magnetic layer 41 and a nonmagnetic metallic layer 42. When the current confined paths 4 has the structure in which the metallic magnetic layer 41 and the nonmagnetic metal layer 42 are stacked, it is possible to reduce the magnetic coupling between the lower and upper metallic magnetic layers 1a and 1b.

In this case, at least one of the metallic magnetic layer 41 and the nonmagnetic metal layer 42, which form the current confined paths 4, may contain a plurality of layers. FIG. 9 shows such an example. In FIG. 9, the current confined paths 4 has a structure in which the metallic magnetic layer 41, the nonmagnetic metal layer 42, the metallic magnetic layer 41, and the nonmagnetic metal layer 42 are stacked. That is, the current confined paths 4 contain the two metallic magnetic layers 41 and the two nonmagnetic metal layers 42.

Figure 10:
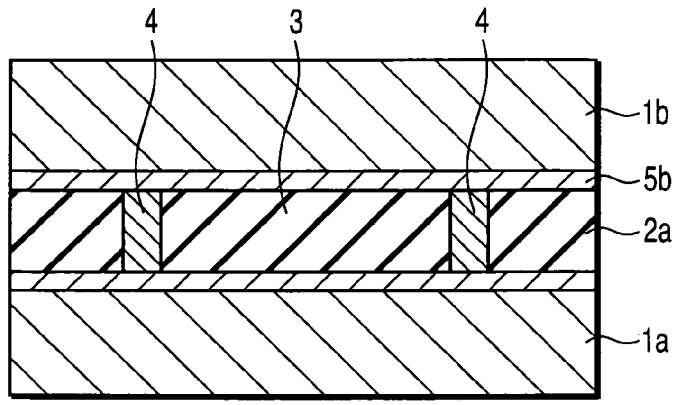
FIG. 10 is a cross-sectional view of a major portion of a magnetoresistive element according to still another embodiment of the present invention.

In FIG. 10, the metallic magnetic layer 1a, the nonmagnetic metal layer 5a, the connection layer 2a, the nonmagnetic metal layer 5b, and the metallic magnetic layer 1b are stacked. The connection layer 2a comprises the insulating layer 3 and the current confined paths 4 penetrating the insulating layer 3. The magnetic coupling between the lower and upper metallic magnetic layers 1a and 1b can also be reduced by sandwiching the nonmagnetic metal layer 5a between the connection layer 2a and the lower metallic magnetic layer 1a, while sandwiching the nonmagnetic metal layer 5b between the connection layer 2a and the upper metallic magnetic layer 1b.

Figure 11:
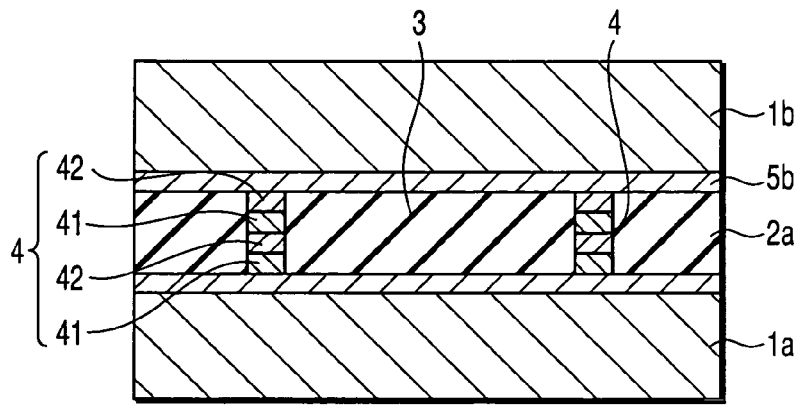
FIG. 11 is a cross-sectional view of a major portion of a magnetoresistive element according to further another embodiment of the present invention.

Moreover, these structures may be combined. FIG. 11 shows an example of a combination. In FIG. 11, the metallic magnetic layer 1a, the nonmagnetic metal layer 5a, the connection layer 2a, the nonmagnetic metal layer 5b, and the metallic magnetic layer 1b are stacked. The connection layer 2a comprises the insulating layer 3 and the current confined paths 4 penetrating the insulating layer 3. Each of the current confined paths 4 has a structure in which the metallic magnetic layer 41, the nonmagnetic metal layer 42, the metallic magnetic layer 41, and the nonmagnetic metal layer 42 are stacked.

If the magnetic coupling between the upper and lower metallic magnetic layers 1a and 1b can be optimally controlled by employing any of the structure shown in FIGS. 8 to 11, then the upper and lower metallic magnetic layers 1a and 1b can be allowed to function as a pinned layer and a free layer, respectively (that is, at least three metallic magnetic layers need not necessarily be used to form a spin spring structure).

Now, applications of the magnetoresistive element (spring spin-valve film) according to the embodiment of the present invention will be described.

Figure 12:
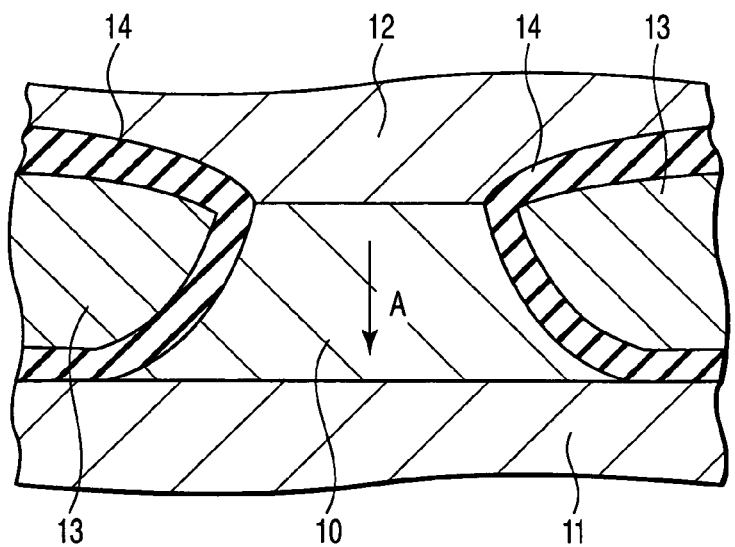
FIG. 12 is a cross-sectional view of a magnetic head according an embodiment of the present invention.
Figure 13:
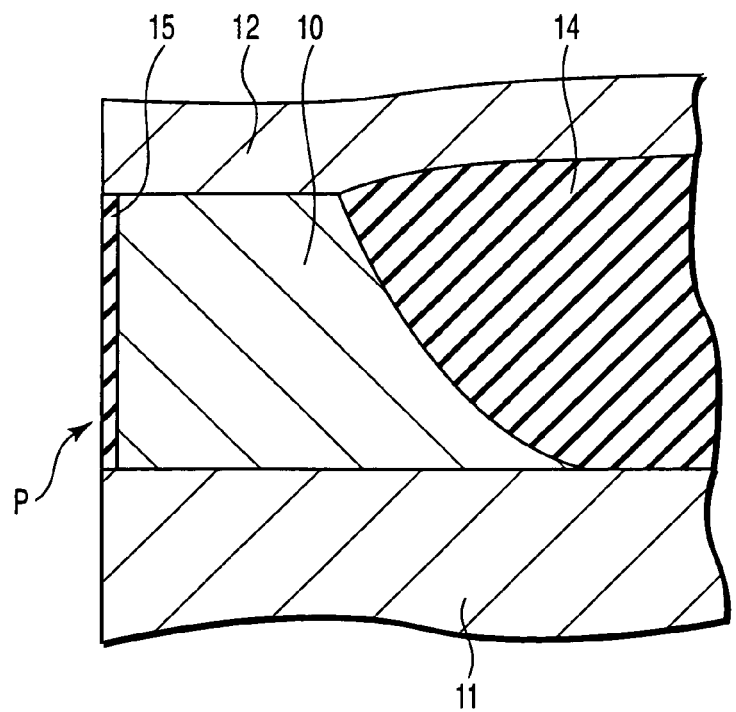
FIG. 13 is a cross-sectional view of a magnetic head according an embodiment of the present invention.

FIGS. 12 and 13 show the magnetoresistive element according to the embodiment of the present invention which is incorporated in a magnetic head. FIG. 12 is a cross-sectional view of the magnetoresistive element taken along a direction substantially parallel to the air bearing surface facing a magnetic recording media (not shown). FIG. 13 is a cross-sectional view of the magnetoresistive element taken along a direction perpendicular to the air bearing surface P.

The magnetic head shown in FIGS. 12 and 13 have a so-called hard abutted structure. The magnetoresistive element 10 has, for example, the structure shown in any one of FIG. 1 and FIGS. 5 to 7. The lower electrode 11 and the upper electrode 12 are provided under and over the magnetoresistive element 10, respectively. In FIG. 12, bias field application films 13 and insulating films 14 are stacked on the both sides of the magnetoresistive element 10. As shown in FIG. 13, a protective layer 15 is provided in the air bearing surface of the magnetoresistive element 10.

A sense current for the magnetoresistive element 10 is supplied by the electrodes 11 and 12 perpendicularly to the plane as shown by arrow A, the electrodes 11 and 12 being arranged under and over the magnetoresistive element 10. Further, the pair of bias field application films 13, 13, provided on the both sides of the magnetoresistive element 10, applies a bias field to the magnetoresistive element 10. The bias field controls the magnetic anisotropy of the free layer in the magnetoresistive element 10 to make the free layer into a single domain. This stabilizes the domain structure of the free layer. It is thus possible to suppress Barkhausen noise associated with movement of magnetic domain walls.

The present invention improves the MR ratio of the magnetoresistive element. Accordingly, the application of the present invention to a magnetic head enables sensitive magnetic reproduction.

The magnetic head shown in FIGS. 12 and 13 may be incorporated in a read and write magnetic head assembly, which can then be mounted in a magnetic recording apparatus.

Figure 14:
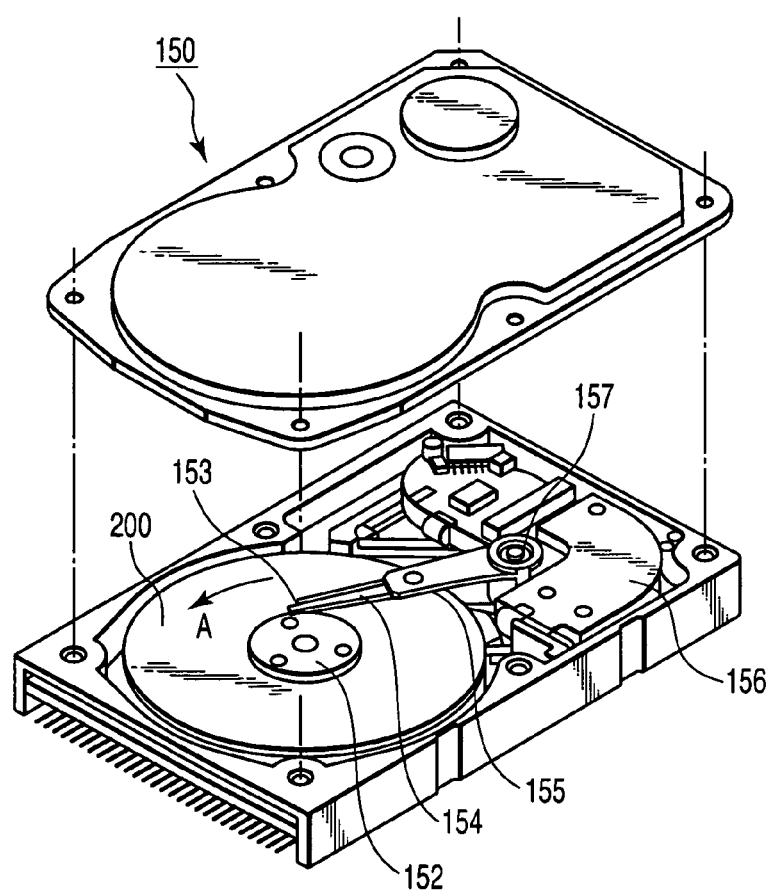
FIG. 14 is a perspective view of a magnetic recording apparatus according to an embodiment of the present invention.

FIG. 14 is a perspective view schematically showing the configuration of a major portion of such a magnetic recording apparatus. A magnetic recording apparatus 150 is of a type using a rotary actuator. In this figure, a magnetic disk 200 is installed on a spindle 152. The magnetic disk 200 is rotated in the direction of arrow A by a motor (not shown) that responds to control signals from a drive controller (not shown). The magnetic recording apparatus 150 according to the present invention may comprise a plurality of disks 200.

A head slider 153 is attached to the tip of a suspension 154 to read from and write to the magnetic disk 200. The head slider 153 has a magnetic head mounted near the tip thereof and including the magnetoresistive element according to any of the above embodiments.

When the magnetic disk 200 rotates, the air bearing surface (ABS) of head slider 153 is held so as to float on the surface of the magnetic disk 200 by a predetermined height. The head slider 153 may be of a so-called in-contact type contacting with the magnetic disk 200.

The suspension 154 is connected to one end of an actuator arm 155. A voice coil motor 156, a kind of linear motor, is provided on the other end of the actuator arm 155. The voice coil motor 156 is composed of a driving coil (not shown) wound around a bobbin on the other end of the actuator arm 155 and a magnetic circuit consisting of a permanent magnet and a counter yoke arranged opposite each other so as to sandwich the coil between the permanent magnet and the counter yoke.

The actuator arm 155 is held by ball bearings (not shown) provided at two vertical positions of the pivot 157. The actuator arm 155 can be rotatably slid by the voice coil motor 156.

Figure 15:
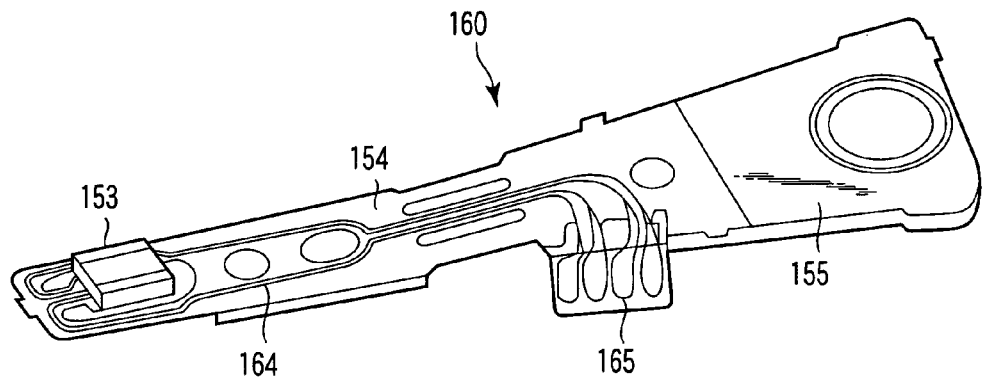
FIG. 15 is a perspective view of a magnetic head assembly according to an embodiment of the present invention.

FIG. 15 is an enlarged perspective view of a part of the magnetic head assembly including tip end side of the actuator arm 155, which is viewed from the disk. The magnetic head assembly 160 has the actuator arm 155, and the suspension 154 is connected to one end of the actuator arm 155.

The head slider 153 is attached to the tip of the suspension 154, and the head slider 153 comprises a magnetic head including the magnetoresistive element according to any of the above embodiments. The suspension 154 has leads 164 used to write and read signals. The leads 164 are electrically connected to respective electrodes in the magnetic head incorporated in the head slider 153. Reference numeral 165 in the figure denotes electrode pads of the magnetic head assembly 160.

The present invention comprises the magnetic head including the magnetoresistive element according to any of the above embodiments of the present invention. This makes it possible to reliably read information magnetically recorded on the magnetic disk 200 at a recording density higher than that in the prior art.

Now, a magnetic memory using the magnetoresistive element according to an embodiment of the present invention will be described. That is, the magnetoresistive element according to any of the above embodiments of the present invention makes it possible to provide a magnetic memory, for example, a magnetic random access memory (MRAM) in which memory cells are arrayed in a matrix.

Figure 16:
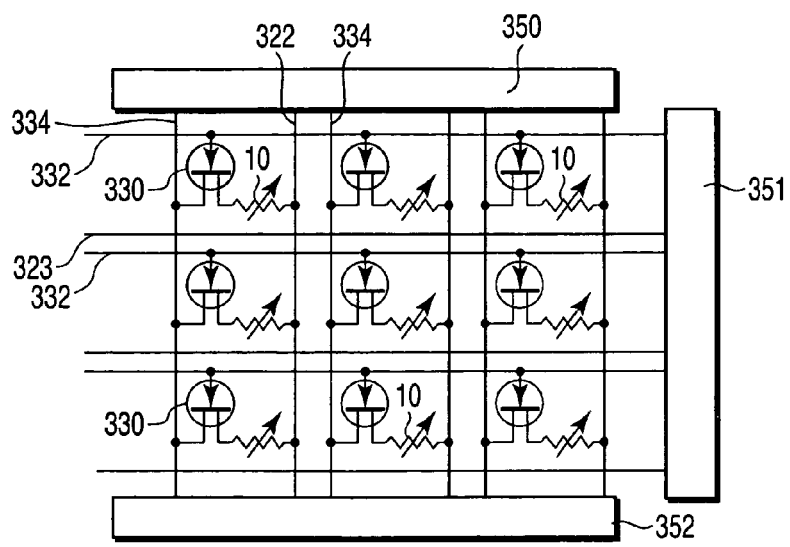
FIG. 16 is a diagram showing an example of the matrix configuration of a magnetic memory according to an embodiment of the present invention.

FIG. 16 is a diagram showing an example of the matrix configuration of a magnetic memory according to an embodiment of the present invention. This figure shows the circuit configuration in which memory cells are arrayed. The magnetic memory comprises a column decoder 350 and a row decoder 351 to select one bit in the array. A bit line 334 and a word line 332 are used to turn on and uniquely select a switching transistor 330. Detection by a sense amplifier 352 enables reading of the bit information recorded in the magnetic recording layer (free layer) in the magnetoresistive element 10. To write bit information, a current is passed through a particular word line 323 and a particular bit line 322 to generate a magnetic field to be applied.

Figure 17:
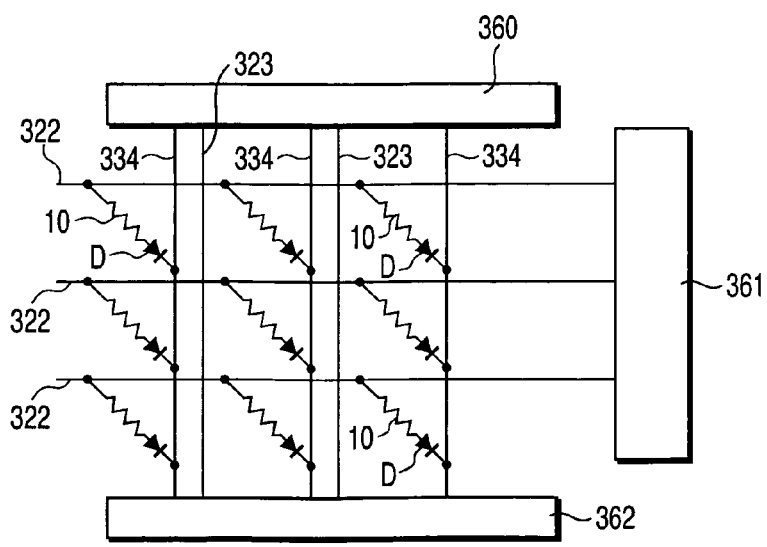
FIG. 17 is a diagram showing another example of the matrix configuration of a magnetic memory according to an embodiment of the present invention.

FIG. 17 is a diagram showing another example of the matrix configuration of a magnetic memory according to an embodiment of the present invention. In this case, one of bit lines 322 is selected by a decoder 361, while one of the word lines 334 is selected by a decoder 360; the bit lines 322 and the word lines 334 are arrayed in a matrix. Thus, a particular memory cell in the array is selected. Each memory cell has a structure in which the magnetoresistive element 10 and a diode D are connected in series. Here, the diode D serves to prevent a sense current from bypassing in the memory cells except the selected magnetoresistive element 10. A write operation is performed by using a magnetic field generated by passing a write current through each of a particular bit line 322 and a particular word line 323.

Figure 18:
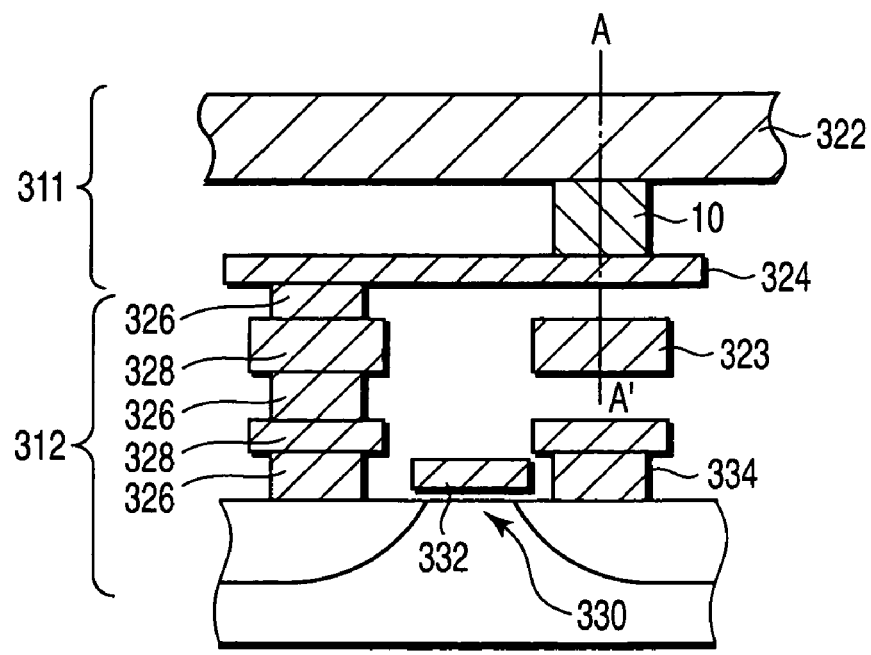
FIG. 18 is a cross-sectional view showing a major portion of a magnetic memory according to an embodiment of the present invention.
Figure 19:
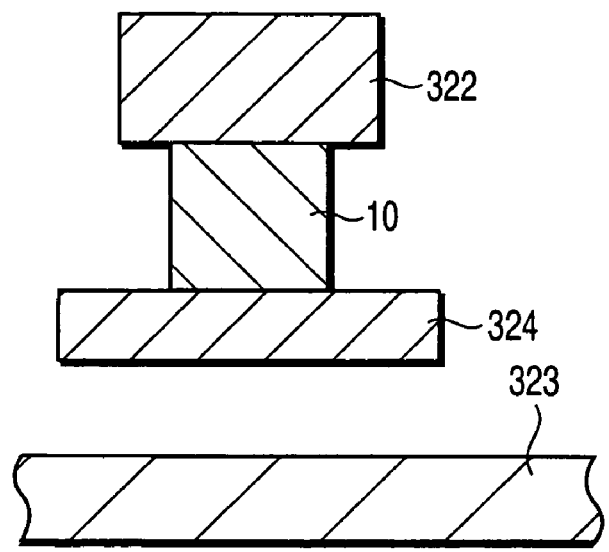
FIG. 19 is a cross-sectional view of the magnetic memory taken along the line A-A' in FIG. 18.

FIG. 18 is a cross-sectional view showing a major portion of a magnetic memory according to an embodiment of the present invention. FIG. 19 is a cross-sectional view taken along the line A-A' in FIG. 18. The structure shown in these figures corresponds to a memory cell for one bit included in the magnetic memory shown in FIG. 16 or 17. The memory cell has a storage element 311 and an address selecting transistor 312.

The storage element 311 has the magnetoresistive element 10 and a pair of wires 322 and 324 connected to the magnetoresistive element 10. The magnetoresistive element 10 is any of the above embodiments.

On the other hand, the selecting transistor 312 is provided with a transistor 330 connected to the magnetoresistive element 10 through vias 326 and buried wires 328. The transistor 330 performs a switching operation in accordance with a voltage applied to a gate 332 to controllably open and close the current path between the magnetoresistive element 10 and a wire 334.

A write wire 323 is provided below the magnetoresistive element 10 in a direction orthogonal to the wire 322. The write wires 322 and 323 can be formed of, for example, aluminum (Al), copper (Cu), tungsten (W), tantalum (Ta), or an alloy of these elements.

In the memory configured as described above, to write bit information to the magnetoresistive element 10, a write pulse current is passed through the wires 322 and 323 to induce a synthetic field. The synthetic field is applied to appropriately reverse the magnetization of the recording layer of the magnetoresistive element.

Further, to read bit information, a sense current is passed through the wire 322, the magnetoresistive element 10 including the magnetic recording layer, and the lower electrode 324. Then, the resistance value or a resistance change of the magnetoresistive element 10 is measured.

The magnetic memory according to the embodiment of the present invention uses the magnetoresistive element (spring spin-valve film) according to any of the above embodiments. Consequently, even with a reduction in cell size, the magnetic domains in the recording layer are surely controlled to allow write and read operations to be reliably performed.

The embodiments of the present invention have been described with reference to the specific examples. However, the present invention is not limited to these specific examples. For example, for the specific structure of the magnetoresistive element as well as the shapes and materials of the electrodes, bias application film, insulating film, and the like, those skilled in the art can similarly implement the present invention to produce similar effects by making appropriate selections from the corresponding well-known ranges.

For example, when the magnetoresistive element is applied to a read magnetic head, the detection resolution of the magnetic head can be defined by providing magnetic shields on both sides of the element.

Further, the present invention can be applied to a magnetic head or magnetic recording apparatus based on a perpendicular magnetic recording system as well as a longitudinal magnetic recording system, and can produce similar effects in any system.

Moreover, the magnetic recording apparatus according to the present invention may be a so-called a rigid type constantly provided with particular recording media or a so-called "removable" type that allows recording media to be exchangeable.

The scope of the present invention also includes all the magnetoresistive elements, magnetic heads, magnetic recording apparatuses, and magnetic memories that can be implemented by those skilled in the art by appropriately changing the designs of the above magnetic heads and magnetic recording apparatuses described above as the embodiments of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetoresistive element comprising:
at least three metallic magnetic layers;
at least two connection layers provided between the at least three metallic magnetic layers, each having an insulating layer and current confined paths comprising a metallic magnetic material penetrating the insulating layer; and
electrodes which supply a current perpendicularly to a plane of a stacked film of the metallic magnetic layers and the connection layers,
wherein a lowermost or uppermost metallic magnetic layer of the at least three metallic magnetic layers has magnetization pinned in a direction, the lowermost metallic magnetic layer and the uppermost metallic magnetic layer are magnetically coupled through the at least two connection layers and one or more intermediate metallic magnetic layers which are stacked alternately and sandwiched between the lowermost and uppermost metallic magnetic layers, and the magnetization direction of the lowermost metallic magnetic layer is orthogonal to that of the uppermost metallic magnetic layer at zero external field with the magnetization direction of the intermediate metallic magnetic layer shifted at an angle of more than 0 degree and less than 90 degrees relative to that of the lowermost metallic magnetic layer or the uppermost metallic magnetic layer,
and wherein the current confined paths have a stacked structure of a metallic magnetic material and a nonmagnetic metal material.

2. The magnetoresistive element according to claim 1, further comprising a nonmagnetic metal layer formed on at least one interface between the connection layers and the metallic magnetic layers.

3. The magnetoresistive element according to claim 1, wherein the connection layer has a thickness in a range between 0.5 nm or more and 2.5 nm or less, the insulating layer is formed of an oxide or nitride of Al, Si, Ti, Hf, Zr, Mo, or Ta, and the current confined paths are formed of a metallic magnetic material containing Co, Fe, or Ni.

4. The magnetoresistive element according to claim 1, wherein the connection layer has a thickness in a range between 0.5 nm or more and 2.5 nm or less, the insulating layer is formed of an oxide containing Fe, and the current confined paths are formed of a metallic magnetic material containing Co, Fe, or Ni.

5. The magnetoresistive element according to claim 1, wherein the current confined paths have a size in a range between 0.5 nm or more and 10 nm or less, and an area ratio of the current confined paths in an area of a plane of the connection layer is in a range between 1 to 30%.

6. The magnetoresistive element according to claim 1, wherein the current confined paths include a plurality of layers of at least one of the magnetic metallic material and nonmagnetic metal material.

7. The magnetoresistive element according to claim 1, further comprising nonmagnetic metal layers formed between both surfaces of the connection layer and an upper and lower metallic magnetic layers thereof.

8. A magnetic recording apparatus comprising a magnetic recording media and the magnetoresistive element according to claim 1.

9. A magnetic memory comprising the magnetoresistive element according to claim 1.

10. The magnetoresistive element according to claim 1, wherein the crystal structure of the metallic magnetic layer has an fcc (111) orientation for an fcc structure, a bcc (110) orientation for a bcc structure, and an hcp (001) or (110) orientation for an hcp structure.

* * * * *